United States Patent [19]

Coplan et al.

[11] 4,413,106
[45] Nov. 1, 1983

[54] HETEROGENEOUS SULFONATION PROCESS FOR DIFFICULTLY SULFONATABLE POLY(ETHER SULFONE)

[75] Inventors: Myron J. Coplan, Natick; Gertrud Götz, Brookline, both of Mass.

[73] Assignee: Albany International Corp., Albany, N.Y.

[21] Appl. No.: 453,162

[22] Filed: Dec. 27, 1982

[51] Int. Cl.³ .................... C08G 65/48; C08G 75/23
[52] U.S. Cl. .................................. 525/534; 525/535; 528/174
[58] Field of Search ................ 528/174; 525/534, 535

[56] References Cited

U.S. PATENT DOCUMENTS

| 3,709,841 | 1/1973 | Quentin | 528/174 |
|---|---|---|---|
| 4,054,707 | 10/1977 | Quentin | 528/174 |
| 4,208,508 | 6/1980 | Hashino et al. | 528/174 |
| 4,268,650 | 5/1981 | Rose | 528/174 |
| 4,273,903 | 6/1981 | Rose | 528/174 |

Primary Examiner—Lester L. Lee
Attorney, Agent, or Firm—Kane, Dalsimer, Kane, Sullivan & Kurucz

[57] ABSTRACT

Novel sulfonated polyarylethersulfones are derived by heterogeneous sulfonation of polymer/solvent intercrystallites of difficultly sulfonatable polyarylethersulfones in chlorinated hydrocarbon solvents with a sulfonation agent.

3 Claims, No Drawings

HETEROGENEOUS SULFONATION PROCESS FOR DIFFICULTLY SULFONATABLE POLY(ETHER SULFONE)

BACKGROUND OF THE INVENTION

1. Field of the Invention

The invention relates to a process of sulfonation of poly(ether sulfones) that is known to be notoriously difficult to sulfonate. The novel sulfonated poly(ether sulfones) and derivatives thereof are useful as membrane forming materials for a variety of separation processes, e.g. reverse osmosis, ultra-filtration, ion exchange and like processes.

2. Brief Description of the Prior Art

Sulfonation of polysulfones is disclosed in U.S. Pat. No. 3,709,841, wherein Quentin describes a preparation of polymers in which part of the aromatic rings are substituted with hydroxysulfonyl radical ($\sim SO_3H$, also called sulfonic groups). However, aromatic poly(ether sulfones) made up of repeating units of the formula:

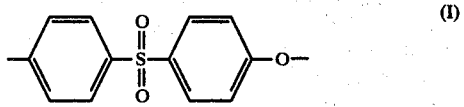
(I)

are notoriously difficult to sulfonate due to the electron withdrawing effect of the sulfone linkages which deactivate the adjacent aromatic rings for electrophilic substitution. Sulfonation of these polymers with chlorosulfonic acid or oleum at ambient temperatures require an enormous excess of sulfonation agent and results in a highly degraded product with extents of sulfonation that are impossible to control. The surplus of sulfonation agents complicate the workup procedures (see U.S. Pat. No. 4,273,903, Examples 10, 11 and 12). In order to overcome the above difficulties, copolymers of the above polysulfones were prepared that contained in addition to the repeat unit (I) described above, a variable amount of easily sulfonatable units of the formula:

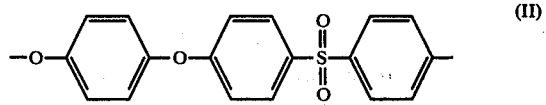
(II)

(see the above cited U.S. Pat. No. 4,273,903).

It was found in the present invention that aromatic poly(ether sulfones) can be sulfonated to controlled degrees of substitution with sulfonating agents. The degree of substitution is controlled by the choice of and mole ratio of sulfonating agent to aromatic rings of the polymer, by the reaction temperature and by the time of the reaction.

Customarily, sulfonation of poly(ether sulfone) polymer is carried out homogeneously, i.e.; by putting the polymer into solution before the addition of a sulfonating agent. This invention concerns a method for carrying out sulfonation in a heterogeneous manner, i.e.; sulfonation of the precipitated polymer crystals.

SUMMARY OF THE INVENTION

The invention comprises a process for the sulfonation of a poly(ether sulfone) containing repeating units of the formula:

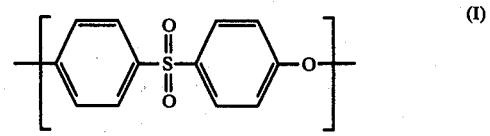
(I)

which comprises;
  providing said poly(ether sulfone) in the form of a solid, suspended in a fluid, chlorinated hydrocarbon; and
  sulfonating the solid form in said suspension.

The sulfonate product of the process of the invention is useful for the preparation of permeable (separatory) membranes.

Poly(ether sulfones) of the formula (I) given above are known to crystallize from a variety of solvents, (e.g. methylene chloride, DMF, DMAC). The crystallization is promoted by agitation or addition of non-solvents (for example, traces of water to methylene chloride). The crystallization involves formation of a mixed polymer/solvent intercrystalline structure, the exact nature of which is still unknown. The solvent/polymer intercrystallites show distinct wide angle X-ray scattering and melting endotherms. The crystalline structure collapses on drying and is accompanied, as expected, by disappearance of X-ray scattering and melting endotherms. The polymer/solvent cocrystalline complex forms a very voluminous solid precipitate which we have dubbed "sludge". Polymer/solvent intercrystallites are usually extremely small, less than $1\mu$ in average diameter and are present in the form of a suspension in a surplus of the solvent.

It was found by us that when chlorinated hydrocarbons are utilized as a suspension medium, sulfonation of the sludge or solid form of poly(ether sulfone) proceeds advantageously. Representative of such chlorinated hydrocarbons are methylene chloride, chloroform, 1,2-dichloroethane, tetrachloromethane and the like. Preferred as the suspension medium is methylene chloride.

The suspension of poly(ether sulfone) crystallites in the preferred chlorinated hydrocarbon provides a unique and convenient system for sulfonations. The structure of the sulfonated product will resemble to a certain extent, that of a block copolymer with alternating regions of highly sulfonated and unsulfonated backbone sequences. The heterogeneously sulfonated polymer has, as expected, a slightly lower solubility in alcohol/$H_2O$ mixtures compared to its homogeneously sulfonated counterpart of analogous ion exchange capacity. The sulfonation process is simple and permits large amounts of polymer to be sulfonated in a single sulfonation run, and therefor contributes to high productivity.

The sulfonated resin products of the process of the invention are generally soluble in polar solvents such as dimethyl formamide (DMF), dimethylacetoamide (DMAC) and the like. The resins with high degrees of sulfonation are soluble in alcohol/water mixtures. The resin products of the process of the invention appear to be structurally unique in that instead of having a random sulfonation, the sulfonic groups appear to be spaced in a select order. Separatory membranes may be advantageously prepared from sulfonated poly(ether sulfone) products of the invention by casting a solution of the resin on a surface of a dense support or onto the surface of a porous support followed by evaporation of the solvent. Reinforced membranes can be prepared by casting onto a screen or a woven fabric. The techniques of preparing membranes from solutions of sulfonated poly(ether sulfones) are well known and details need not be recited herein; see for example the techniques described in British Pat. No. 1,350,342.

The sulfonation is carried out by simple admixture of the suspension of polymer of the formula (I) given above, with a sulfonation agent. Representative of such agents are chlorosulfonic acid and, preferably, sulfur trioxide. The sulfonating agent may be employed in sufficient proportion to obtain a ratio of the number of sulfur atoms in the sulfonation agent to the number of sulfur atoms in the polymer which is within the range of between 0.4:1 to 5:1 although this is not critical. The temperature at which sulfonation takes place is also not critical. An advantageous temperature is within the range of from $-50°$ to $+80°$ C., preferably from $-10°$ to $+25°$ C.

When the desired degree of sulfonation has been reached, the desired sulfonated polymer may be separated from the reaction mixture by conventional techniques such as by filtration, washing and drying.

The polymer products of the process of the invention may be neutralized with the addition of a base, such as ammonia, when desired and converted to the alkali salts thereof. The alkali salts of the polymer products of the invention may be used for the same purposes as the parent acid polymers.

The following examples describe the manner and process of making and using the invention and set forth the best mode contemplated by the inventors for carrying out the invention but are not to be construed as limiting.

EXAMPLE 1

350 g (1.5 moles) of a poly(ether sulfone) having the formula (I) described above (Victrex; PES-600P; Imperial Chemical Industries, Ltd., England) predried 4 hours at 150° C. were dissolved in 3.5 liters of methylenechloride (HPLC grade solvent; Fisher Scientific). The solution was stirred overnight (600 rpm) at room temperature. Crystallization usually takes place within hours, however, the process is strongly dependent on stirring conditions and on trace amounts of moisture being present.

After crystallization, the resulting sludge suspension (kept under a dry $N_2$ blanket) was cooled to 0°–5° C. with continuous stirring. A 10% solution of 65.2 cc (1.5 moles) of sulfur trioxide (Allied Chemicals stabilized Sulfan B in $CH_2Cl_2$) was prepared and added slowly within a 90 minute period to the vigorously stirred "sludge". The resulting reaction mixture was stirred for an additional 2 hours. The coolant was removed and the top methylenechloride layer decanted. The precipitate was washed with fresh $CH_2Cl_2$ and dried in a vacuum oven ($10^{-1}$ torr) at 30°–40° C. to a constant weight. The ion exchange capacity (IEC) of the sulfonated polymer is about 1.8–1.9 meq/g.

EXAMPLE 2

The procedure of Example 1, supra., was repeated except that a lower $SO_3$/polymer mole ratio was utilized. Thus, only 19.6 cc (0.45 moles) of $SO_3$ were added to 350 g (1.51 moles) of Victrex to yield 385 g of sulfonated polymer with an IEC of 1.0 meq/g.

EXAMPLE 3

The poly(ether sulfone) Victrex supra., was sulfonated as described in Example 2, except that after the reaction was completed dry ammonia gas was bubbled through the vigorously stirred reaction mixture kept at 5° C. After the reaction mixture was brought to pH 8 the introduction of $NH_3$ was terminated. The top $CH_2Cl_2$ layer was decanted. The neutralized sulfonated polymer was washed twice with fresh $CH_2Cl_2$ and dried in a vacuum oven ($10^{-2}$ torr) at 50° C. to a constant weight. The yield of the neutralized sulfonated poly(ether sulfone) was 99%.

EXAMPLE 4

The poly(ether sulfone) Victrex was treated with Sulfan B as described in Example 1, except that a 0.35:1 ratio of $SO_3$ per aromatic ring was utilized. 125 g (0.54 moles) of poly(ether sulfone) Victrex were dissolved in 940 cc of $CH_2Cl_2$ and after the crystallization took place 16.4 cc (0.38 moles) of $SO_3$ as a 10% in $CH_2Cl_2$ were slowly added to the vigorously stirred reaction mixture within a 90 minute period. The reaction mixture was stirred for an additional 2 hours, the top $CH_2Cl_2$ layer decanted and the reaction product washed twice with 5 N KCl solution.

The neutralized sulfonated polymer in the potassium form was washed with deionized water until no traces of $Cl^-$ ion could be detected and dried to a constant weight in a vacuum oven ($10^{-1}$ torr, 50° C.). The yield was 98% and the IEC of the sulfonated polymer 1.5 meq/g.

EXAMPLE 5

10 g of sulfonated poly(ether sulfone) prepared as in Example 4 were dissolved in 30 cc of dimethyl formamide. The solution was cast on a glass plate and drawn down to thickness of 100$\mu$ with a Gardner knife. The solvent was swept with the stream of dry nitrogen at 60° C. and the film was finally dried at 150° C. for 30 minutes. The permselectivity of the membrane estimated from the membrane potential measured between the 0.1 N and 1 N KCl solution was 95% and the electrical resistance 26$^{ohm}$/cm$^2$ (measured in 0.1 N KCl solution at 25° C.).

EXAMPLE 6

5 g of sulfonated poly(ether sulfone) prepared as in Example 1 were dissolved in 100 cc of isopropyl alcohol water mixture 90/10 by volume. A composite hollow fiber membrane was then prepared by coating a porous polysulfone hollow fiber continuously with the prepared coating solution as described in the report to the Office of Water Research and Technology, U.S. Department of Interior, Contract No. 14-34-0001-9531.

The composite hollow fiber membrane prepared as described above was found to be useful in a reverse osmosis water desalination process. The membrane exhibited fluxes between 1.5–2 gfd combined with 90% salt rejection of 3000 ppm NaCl solution at a pressure of 400 psi (25° C.).

EXAMPLE 7

The poly(ether sulfone) Victrex was treated with Sulfan B as described in Example 1, except that 1:1 ratio of SO₃ per aromatic ring was utilized. 350 g (1.5 moles) of Victrex were dissolved in 3.5 liters of methylene chloride and after the crystallization took place 130.5 cc (3.0 moles) of HClSO₃ as a 10% solution in CH₂Cl₂ were added slowly within a 90-minute period to the vigorously stirred reaction mixture. The work-up was carried out as in Example 1 to yield 420 g of sulfonated poly(ether sulfone).

EXAMPLE 8

5 g of sulfonated poly(ether sulfone) prepared as in Example 7 were dissolved in 100 cc of methyl alcohol water mixture 95/5 by volume. A composite hollow fiber membrane was then prepared following the procedure described in Example 6. The membrane exhibited fluxes between 20 to 30 gfd combined with 60–70% salt rejection when utilized in a reverse osmosis desalination process of 3000 ppm NaCl solution at a pressure of 400 psi (25° C.).

What is claimed:

1. A process for the sulfonation of a poly(ether sulfone) consisting essentially of repeating units of the formula:

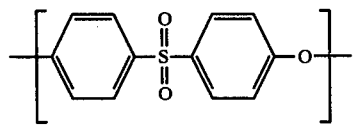

which comprises;
providing said poly(ether sulfone) in the form of a polymer/solvent intercrystalline solid, suspended in a fluid, chlorinated hydrocarbon; and
sulfonating the solid form in said suspension at a temperature within the range of from −50° to +80° C. with a sulfonating agent in sufficient proportion to obtain a ratio of the number of sulfur atoms in the sulfonation agent to the number of sulfur atoms in the polymer, which is within the range of between 0.4:1 to 5:1.

2. The process of claim 1 wherein the hydrocarbon is methylene chloride.

3. The process of claim 1 wherein the sulfonation agent is sulfur trioxide.

* * * * *